(12) United States Patent
Sato et al.

(10) Patent No.: US 6,515,695 B1
(45) Date of Patent: Feb. 4, 2003

(54) TERMINAL AND SYSTEM FOR MULTIMEDIA COMMUNICATIONS

(75) Inventors: Jun Sato, Tokyo (JP); Akira Irube, Kanagawa-ken (JP); Nobuhiro Inoue, Tokyo (JP); Yoshihiro Kataoka, Tokyo (JP); Yasunori Arai, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/435,465

(22) Filed: Nov. 8, 1999

(30) Foreign Application Priority Data

Nov. 9, 1998 (JP) .......................................... 10-333415

(51) Int. Cl.$^7$ ................................................ H04N 7/14
(52) U.S. Cl. ................................ 348/14.08; 348/14.01; 348/14.03
(58) Field of Search .......................... 348/14.01, 14.03, 348/14.08, 14.11, 14.14; 379/90.01, 93.09, 93.14, 88.13, 93.23, 142, 100.15; 370/475; H04N 7/14, 7/15

(56) References Cited

U.S. PATENT DOCUMENTS

| | | | |
|---|---|---|---|
| 5,371,534 A | * 12/1994 | DAgdeviren et al. | .... 348/14.01 |
| 5,953,505 A | * 9/1999 | Chida | .......................... 370/475 |
| 6,163,335 A | * 12/2000 | Barraclough | ............. 379/93.21 |

FOREIGN PATENT DOCUMENTS

| | | | | |
|---|---|---|---|---|
| JP | 362077734 A | * | 4/1987 | ............ H04L/11/20 |
| JP | 401311744 A | * | 12/1989 | ............ H04M/1/00 |
| JP | 404255155 A | * | 9/1992 | ............ H04M/11/00 |
| JP | 405252370 A | * | 9/1993 | ............ H04N/1/32 |
| JP | 406030088 A | * | 2/1994 | ............ H04M/1/00 |
| JP | 406225054 A | * | 8/1994 | ............ H04N/1/00 |
| JP | 7-30871 | | 1/1995 | |
| JP | 4070233359 A | * | 1/1995 | ............ H04N/7/15 |
| JP | 407264298 A | * | 10/1995 | ............ H04M/3/42 |
| JP | 4082940101 A | * | 11/1996 | ............ H04N/7/14 |
| JP | 9-46435 | | 2/1997 | |

\* cited by examiner

*Primary Examiner*—Melur Ramakrishnaiah
(74) *Attorney, Agent, or Firm*—Finnegan, Henderson, Farabow, Garrett & Dunner, L.L.P.

(57) ABSTRACT

There is disclosed a multimedia communications terminal capable of quickly connecting with the other party with less burden on the exchange station. The terminal has a phone book memory for storing a phone book database and image data. One record consists of a phone book memory number, a phone number, a name, an encrypting flag, a terminal kind number, a send/receive YES/NO flag, a sender information notice flag, and an address at which image data is stored. The terminal further includes a main controller including a CPU, a ROM, and a RAM. The main controller controls all the portions of the terminal to realize the operation of a portable videophone. When an outgoing call is made, the phone book memory is referenced. The outgoing call is made in connection procedures adapted for the kind of the other party.

7 Claims, 14 Drawing Sheets

FIG. 2

| PHONE BOOK MEMORY NO. | PHONE NO. | NAME | ENCRYPTING FLAG | TERMINAL KIND NO. | SEND/RECEIVE YES/NO FLAG | SENDER INFO. NOTICE FLAG | ADDRESS AT WHICH IMAGE DATA STORED |
|---|---|---|---|---|---|---|---|
| 1 | 03-3454-XXXX | ○○△△ | 1 | 3 | 01 | 0 | XXXX |
| 2 | 010-23-XXXXX | ○○×× | 0 | 11 | 11 | 1 | |
| 3 | 044-345-XXXX | ○×△○ | 1 | 2 | 10 | 1 | |
| 4 | 050-43-XXXXX | ○△×□ | 0 | 13 | 00 | 0 | |
| 5 | 011-766-XXXX | ○□×○ | 0 | 1 | 01 | 1 | |
| 6 | | | | | | | |

FIG. 3

| FLAG VALUE | DEFINITION |
|---|---|
| 1 | DISPLAY OF THE CORRESPONDING RECORD IS PERMITTED AT ANY TIME |
| 0 | DISPLAY OF THE CORRESPONDING RECORD IS PERMITTED ONLY IF THE ENCRYPTING FUNCTION IS CANCELED |

FIG. 4

| TERMINAL KIND NO. | THE KIND OF THE TERMINAL | THE KIND OF THE PROTOCOL |
|---|---|---|
| 1 | ANALOG PHONE (AUDIO) | p1 |
| 2 | ANALOG PHONE (MULTIMEDIA) | p2 |
| 3 | ANALOG PHONE (AUDIO/MULTIMEDIA) | p3 |
| 4 | ISDN PHONE (AUDIO) | p1 |
| 5 | ISDN PHONE (MULTIMEDIA) | p2 |
| 6 | ISDN PHONE (AUDIO/MULTIMEDIA) | p3 |
| 7 | CELLULAR PHONE (AUDIO) | p1 |
| 8 | CELLULAR PHONE (MULTIMEDIA) | p2 |
| 9 | CELLULAR PHONE (AUDIO/MULTIMEDIA) | p3 |
| 10 | DIGITAL CELLULAR PHONE (AUDIO) | p1 |
| 11 | DIGITAL CELLULAR PHONE (MULTIMEDIA) | p2 |
| 12 | DIGITAL CELLULAR PHONE (AUDIO/MULTIMEDIA) | p3 |
| 13 | PHS PHONE (AUDIO) | p1 |
| 14 | PHS PHONE (MULTIMEDIA) | p2 |
| 15 | PHS PHONE (AUDIO/MULTIMEDIA) | p3 |
| 16 | UNKNOWN | p3 |

FIG. 5

| SEND/RECEIVE VIDEO DATA YES/NO FLAG (YES:1, NO:0) | | |
|---|---|---|
| ("T") TRANSMISSION | ("R") RECEPTION | DEFINITION |
| 0 | 0 | NEITHER "T" NOR "R" IS PERMITTED |
| 0 | 1 | "R" IS PERMITTED, "T" IS NOT PERMITTED |
| 1 | 0 | "T" IS PERMITTED, "R" IS NOT PERMITTED |
| 1 | 1 | BOTH "T" AND "R" ARE PERMITTED |

FIG. 6

| FLAG VALUE | DEFINITION |
|---|---|
| 1 | INFORMATION OF THE SENDER IS SENT TO THE OTHER PARTY |
| 0 | INFORMATION OF THE SENDER IS NOT SENT TO THE OTHER PARTY |

14 LCD

"ENCRYPT THE PHONE NUMBER ?"

14 LCD

"IS IT OK TO STORE THIS IMAGE INTO THE PHONE BOOK ?"

TERMINAL AND SYSTEM FOR MULTIMEDIA COMMUNICATIONS

BACKGROUND OF THE INVENTION

1. Field of the Invention

The present invention relates to a multimedia communications terminal having videophone capabilities that permit voice communications while sending and receiving pictures taken from talkers. The invention also relates to a multimedia communications system having such terminals.

2. Description of the Related Art

At present, multimedia communications terminals having videophone capabilities have been put into practical use in applications using ISDN (Integrated Services Digital Network), digital cellular phones, PHS (Personal Handyphone System) or the like. Some of these multimedia communications terminals have a phone book function capable of storing information such as names, phone numbers, images (e.g., an image of the face of the other party while talking), as described in Japanese Unexamined Patent (Kokai) Nos. 30871/1995, and 46435/1997.

Such a multimedia communications terminal having videophone capabilities as described above can store information about individual persons such as the name and images of the other party in its phone book database. However, the communications terminal does not have a function of storing the kinds of data that can be handled as communications data (e.g., audio data and video data).

Therefore, with the prior art multimedia terminal, an outgoing call is once made according to protocols that permit voice communications to establish a communications link with a single call, whether the terminal of the other party supports only voice communications or permits multimedia communications. Then, a check is made if the terminal of the other party supports multimedia communications. If the check is done, multimedia communications are carried out.

In this way, to discern the kinds of data capable of being handled by the terminal of the other party, the prior art multimedia communications terminal needs complex procedures for call control. Also, extra bearer transmission to the communications terminal takes place until multimedia communications are initiated. This increases the burden on the switching station. Furthermore, it takes a long time to complete the interconnection.

In this multimedia communications terminal, image received from the other party and the name of the person within the image are stored in a correlated manner to each other in a phone book database.

Where image data taken from the other party is stored in the phone book database, even images what the other party does not want to be stored are stored. This may infringe the privacy and the right to his or her portraits.

The prior art multimedia communications terminal necessitates complex procedures for call control to discern the kinds of data capable of being handled by the other terminal. Extra bearer transmission to the communications terminal takes place. This increases the burden on the switching station. Furthermore, it takes a long time to complete the interconnection.

Moreover, in the prior art multimedia communications terminal, even images what the other party does not want to be stored are stored in a phone book database. This may infringe the privacy and the right to portraits of the other party.

SUMMARY OF THE INVENTION

In an attempt to solve the foregoing problems, the present invention has been made. It is an object of the present invention to provide a multimedia communications terminal which can be quickly connected with a desired party with less burden on the switching station.

It is another object of the invention to provide a multimedia communications terminal and multimedia communications system capable of storing image accepted from the other party as phone book data items without infringing the privacy or the right to portraits of the other party.

It is a further object of the invention to provide a multimedia communications terminal and multimedia communications system which, if the other party with which the present terminal is communicating refuses storing video data accepted from the other party, checks that the terminal of the other party supports multimedia communications by referring to a phone book database.

It is a yet other object of the invention to provide a multimedia communications terminal capable of switching the mode of operation between transmission/reception mode and reception-only mode according to the kind of information. For example, audio data are both transmitted and received but video data are only received.

It is a still other object of the invention to provide a multimedia communications terminal capable of informing the other party of the name of the caller according to the other party when an outgoing call is made.

The objects described above are achieved in accordance with the teachings of the invention by a multimedia communications terminal capable of at least sending or receiving video information, the terminal being equipped with a means for storing information for discerning other party and information indicating the communications capabilities of the terminal of the other party such that these two kinds of information are correlated with each other.

The multimedia communications terminal described above is characterized in that it has the other party information storage means to store the information for discerning the other party and the information indicating the communications capabilities of the other party in a correlated manner to each other.

Accordingly, with this multimedia communications terminal, the user can grasp the communications capabilities of the other party by referring to the information stored in the other party information storage means. Therefore, the user can make a call connection in procedures adapted for the other party. This alleviates the burden on the switching station. Hence, a connection with the other party can be quickly made.

The present invention also provides a multimedia communications terminal comprising a communications capability information storage detection means for sensing whether information about the communications capability of the other party is stored in said other party information storage means and a communication capability information writing means for storing communications capability information gained from the other party and information for discerning the other party in said other party information storage means such that these two kinds of information are correlated with each other, if the communications capability information storage detection means senses that said communications capabilities are not stored.

The multimedia communications terminal of the construction described above is equipped with the other party information storage means for storing information for discerning the other party and information indicating the communications capabilities of the terminal of the other party such that these two kinds of information are correlated with each other. If the communication capability information of the other party are not stored in the other party information storage means, communication capability information gained from the other party is stored in the other party information storage means.

Accordingly, with the multimedia communications terminal of the construction described above, the user can make a call connection in procedures adapted for the communications capabilities of the other party by referring to the information stored in the other party information storage means. Consequently, the burden on the switching station is reduced. A connection with the other party can be quickly made. If information about the communications capabilities of the other party is not stored, the information can be gained from the other party and stored in the other party information storage means.

The present invention also provides a multimedia communications terminal comprising a communications capability information storage detection means for determining whether information indicating the communications capabilities and newly gained from the other party agrees with the information stored in the other party information storage means and a communications capability information writing means for updating the information stored in the other party information storage means to the information newly gained from the other party regarding the communications capabilities.

The multimedia communications terminal of the construction described above is equipped with the other party information storage means for storing information for discerning the other party and information indicating the communications capabilities of the terminal of the other party such that these two kinds of information are correlated with each other. If information about the communications capabilities newly obtained from the other party does not agree with information stored in the other party information storage means, the information stored in the other party information storage means is updated to the information about the communications capabilities newly obtained from the other party.

Accordingly, the multimedia communications terminal of the construction described above permits the user to make a call connection in procedures adapted for the communications capabilities of the other party by referring to the information stored in the other party information storage means. This reduces the burden on the switching station. It is possible to connect with the other party quickly. If the information about the communications capabilities of the other party has changed, the information can be updated to the new information and stored in the other party information storage means.

The objects described above are also achieved in accordance with the teachings of the invention by a multimedia communications terminal comprising a communications means for making a call connection in given procedures adapted for the communications capabilities stored in the other party information storage means.

The multimedia communications terminal of the construction described above has the other party information storage means for storing the information for discerning the other party and the information indicating the communications capabilities of the terminal of the other party such that these two kinds of information are correlated with each other. An outgoing call is made in procedures adapted for the information stored in the other party information storage means.

Accordingly, the multimedia communications terminal enables the user to make a call connection in procedures adapted for the communications capabilities of the other party even if the user does not grasp the communications capabilities of the other party. Thus, the burden on the switching station is reduced. A connection with the other party can be quickly made.

The objects described above are also achieved in accordance with the teachings of the invention by a multimedia communications terminal capable of sending and receiving at least one of video information, audio information, and data information, said terminal comprising: other party information storage means for storing information indicating whether information capable of being sent and received by said multimedia communications terminal is sent or received to and from the other party in connection with information for identifying the other party; and a communications means for sending and receiving information to and from the other party according to information stored in said other party information storage means.

The multimedia communications terminal of the construction described above controls transmission and reception of information to and from this multimedia communications terminal according to information stored in the other party information storage means.

Accordingly, the multimedia communications terminal of the construction described above can determine whether transmission and reception of audio data, video data, or data information should be done according to information. For example, with respect to audio data, they are sent and received. With respect to video data, they are only received.

The objects described above are also achieved in accordance with the teachings of the invention by a multimedia communications terminal capable of communicating in terms of audio and video data, the terminal comprising: other party information storage means for storing information indicating whether a notice of the sender is given to the other party in a correlated relation to information for discerning the other party; and a communications means for giving a notice of the sender according to the information stored in said other party information storage means when an outgoing call is made.

In the multimedia communications terminal of the construction described above, information indicating whether a notice of the sender is given to the other party is stored in the other party information storage means. When an outgoing call is made, a notice of the sender is given according to the information stored in the other party information storage means.

Consequently, with the multimedia communications terminal of this construction, a notice of the sender is given according to the other party when an outgoing call is made.

The objects described above are also achieved in accordance with the teachings of the invention by a multimedia communications terminal capable of communicating in terms of audio and video data, the terminal comprising: other party information storage means for storing information for discerning the other party and video information such that these two kinds of information are correlated to each other; an image storage YES/NO inquiry means for sending an inquiry to the other party to ask whether video data received from the other party supporting multimedia communications are permitted to be stored as said video information; and an image information writing means for storing said image information in said other party information storage means if response to the inquiry to the other party by the image storage YES/NO inquiry means is affirmative.

The multimedia communications terminal of the construction described above asks the other party whether the video data received from the other party are allowed to be stored. If response is affirmative, the video data received from the other party are stored.

Accordingly, with the multimedia communications terminal of the construction described above, image accepted from the other party can be stored in a phone book database without infringing the privacy or the right to portraits of the other party.

The objects described above are also achieved in accordance with the teachings of the invention by a multimedia communications terminal capable of communicating in terms of audio and video data, the terminal comprising: an image information writing means for storing given information for indicating that the terminal of said other party supports multimedia communications in case that response to the inquiry by the image storage YES/NO inquiring means in said other party information storage means.

In the multimedia communications terminal of the construction described above, if storing the video data received from the other party is rejected by the other party, given image information indicating that the terminal of other party supports multimedia communications is stored instead of the video data described above.

Accordingly, with the multimedia communications terminal of the construction described above, if the other party rejects storing the video data received from the other party, it can be seen that the terminal of the other party supports multimedia communications by referring to the other party information storage means.

The objects described above are also achieved in accordance with the teachings of the invention by a multimedia communications system comprising first and second multimedia communications terminals capable of communicating with each other in terms of audio and video data. The first multimedia communications terminal is equipped with a responsive means for responding to an inquiry as to whether video data from the second multimedia communications terminal are allowed to be stored or not. The second multimedia communications terminal comprises: other party information storage means for storing information for discerning the other party and video information such that these two kinds, of information are correlated to each other; an image storage YES/NO inquiry means for sending an inquiry to the other party to ask whether the video data received from the terminal of the other party supporting multimedia communications are allowed to be stored as said video information; and a video information writing means for storing said video information in said other party information storage means if response to the inquiry made by the image storage YES/NO inquiry means is that storing is permitted.

With the multimedia communications system of the construction described above, an inquiry is sent to the other party to ask whether video data received from the other party are allowed to be stored. If the response is affirmative, the video data received from the other party are stored.

Accordingly, with the multimedia communications system of the construction described above, image taken from the other party can be stored in a phone book database without infringing the privacy or the right to portraits of the other party.

The objects described above are also achieved in accordance with the teachings of the invention by a multimedia communications system capable of providing communications in terms of audio and video information, the multimedia communications terminal comprising: image information writing means for storing given image information indicating that said other party supports multimedia communications if response to an inquiry from said image storage YES/NO inquiry means is that storing is not permitted.

In the multimedia communications system of the construction described above, if storing the video data received from the multimedia communication terminal of the other party is rejected by the other party in communications between multimedia communication terminals, given image information indicating that the terminal of the other party supports multimedia communications is,stored instead of the video data described above by one terminal.

Therefore, with the multimedia communications system of the construction described above, even if storing the video data received from the other party is rejected, the multimedia communications terminal can see that the terminal of the other supports multimedia communications by referring to the other party information storage means.

Other objects and features of the invention will appear in the course of the description thereof, which follows.

BRIEF DESCRIPTION OF THE DRAWINGS

FIG. 2 is a diagram illustrating data stored in a phone book memory of the multimedia communications terminal shown in FIG. 1;

FIG. 3 is a table illustrating an encrypting flag stored in the phone book memory of the multimedia communications terminal shown in FIG. 1;

FIG. 4 is a table illustrating the relations of terminal kind numbers stored in the phone book memory of the multimedia communications terminal shown in FIG. 1 to protocols p1–p3;

FIG. 5 is a table illustrating a send/receive YES/NO flag stored in the phone book memory of the multimedia communications terminal shown in FIG. 1:

FIG. 6 is a table illustrating a sender information notice flag stored in the phone book memory of the multimedia communications terminal shown in FIG. 1;

DESCRIPTION OF THE PREFERRED EMBODIMENTS

Figure 1:
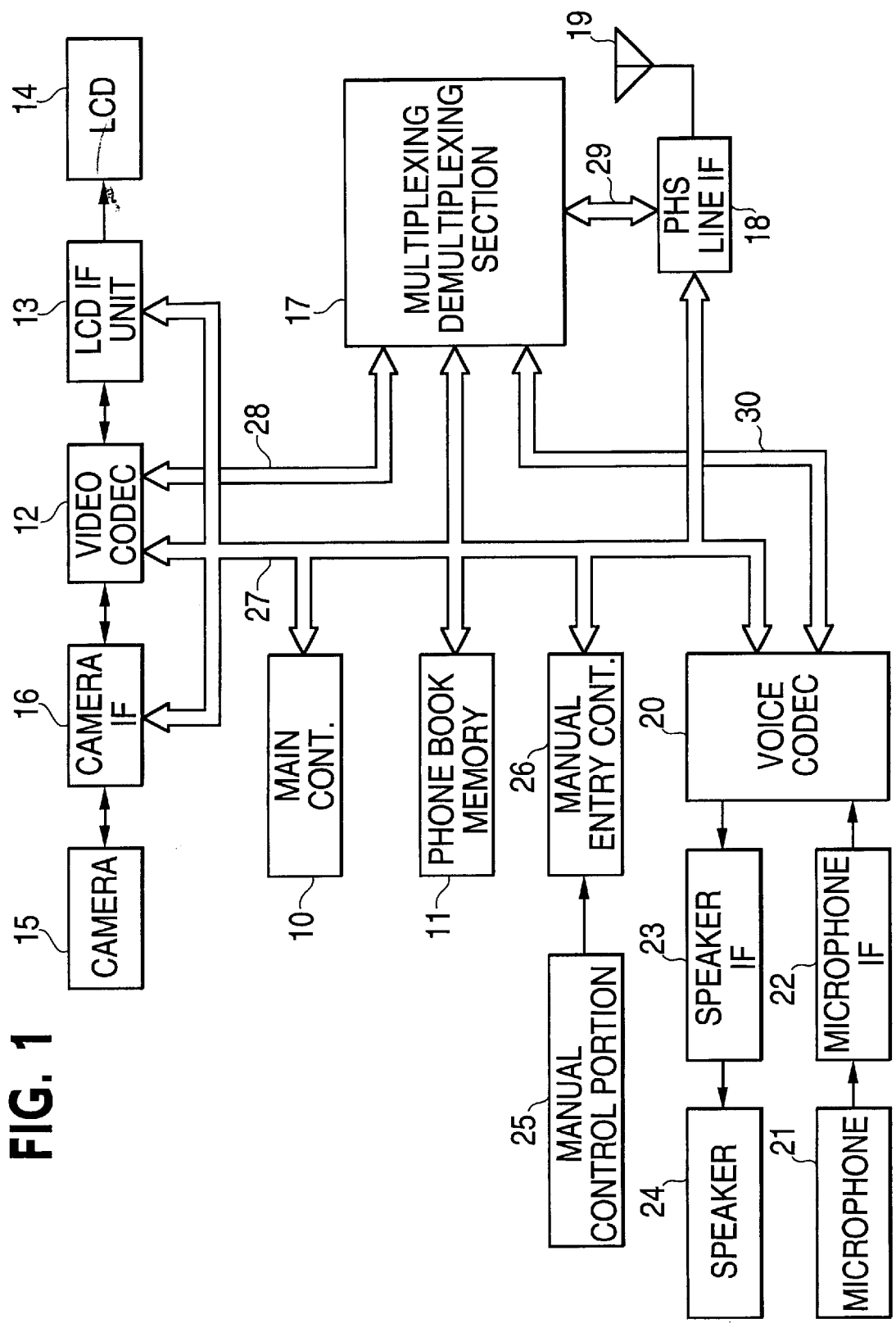
FIG. 1 is a block diagram of a multimedia communications terminal in accordance with the present invention.

Referring to FIG. 1, there is shown a multimedia communications terminal in accordance with one embodiment of the invention.

This terminal comprises a main controller 10, a phone book memory 11, a video coded 12, an LCD interface (LCD IF unit) 13, a liquid crystal display (LCD) unit 14, a camera portion 15, a camera interface (camera IF) 16, a multiplexing and separating section 17, a PHS line interface (PHS line IF) 18, an antenna 19, a voice coded 20, a microphone 21, a microphone interface (micro IF) 22, a speaker interface (speaker IF) 23, a speaker 24, a manual control portion 25, and a manual entry control circuit portion 26.

Of these components, the main controller 10, the phone book memory 11, the video coded 12, the LCD interface 13, the camera interface 16, the multiplexing and separating section 17, the PHS line interface 18, the voice coded 20, and the manual entry control circuit portion 26 are connected together via a main bus 27.

The multiplexing and separating section 17 is connected with the video coded 12, the PHS line interface 18, and the voice coded 20 via sync buses 28, 29, and 30.

The main controller 10 consists of a CPU, a ROM, a RAM, and so on. The operations of the various portions of the present multimedia communications terminal are under control of the main controller 10, whereby realizing the operation of a portable videophone. The main controller 10 realizes processing means for accomplishing various functions in software according to data stored in the ROM, RAM, and phone book memory 11 (described later) of the main controller 10 itself.

The main controller 10 stores in ROM thereof protocol p1 for providing voice communications, protocol p2 for providing multimedia communications, and protocol p3 permitting switching to multimedia communications after voice communications.

In the ROM described above, each protocol stored is made to correspond to terminal kind numbers stored in the phone book memory 11 described later according to the contents of communications. Terminal kind numbers "1", "4", "7", "10", and "13" described later are made to correspond to the protocol p1. Terminal kind numbers "2", "5", "8", "11", and "14" are made to correspond to the protocol p2. Terminal kind numbers "3", "6", "9", "12", "15", and "16" are made to correspond to the protocol p3.

The aforementioned phone book memory 11 is used to store a phone book database and image data. This database is composed of plural records. Each record comprises a phone book memory number, a phone number, a name, an encrypting flag, a terminal kind number, send/receive YES/NO flag, a sender information notice flag, an address at which image data is stored, and the like, as shown in FIG. 2.

The encrypting flag described above is information for controlling the method of displaying a corresponding record on the LCD 14 (described later). When this flag is set to "0", display of the corresponding record is permitted at any time, as shown in FIG. 3. When the flag is set to "1", display of the corresponding record is permitted only if entry of a predetermined secret number or password cancels the encrypting function.

The above-described terminal kind number is information indicating the kind of the terminal of the other party corresponding to the record. As shown in FIG. 4, terminals are classified into analog phone, ISDN phone, analog cellular phone, digital cellular phone, PHS phone, and so on. Furthermore, terminals are classified into terminals supporting phone communications services capable of providing audio-only communications, terminals supporting multimedia communications services capable of providing communications both by audio and video data, and terminals supporting both phone communications services and multimedia communications services. The protocols p1–p3 are made to correspond to these kinds of terminals in the ROM of the main controller 10.

If the kind of the other party is not known, it is treated as "unknown" and terminal class number "16" is given to it.

The send/receive YES/NO flag is information indicating whether transmission and reception of video data is permitted or not, when communications with the other party corresponding to the record are made. This send/receive YES/NO flag assumes states as shown in FIG. 5, for example.

The aforementioned sender information notice flag is information indicating whether information of the present user (e.g., phone number, name, and terminal kind number) is sent to the other party. This flag takes states as illustrated in FIG. 6.

The video codec 12 decodes and reproduces encoded video data, and sends the reproduced video data to the LCD interface 13. Furthermore, the video codec 12 encodes video data supplied from the camera portion 15 via the camera interface 16 and creates MPEG-4 encoded video data.

The LCD interface 13 converts the video data supplied from the video codec 12 into a signal form that can be processed by the LCD 14, and sends the converted data to the LCD 14. This LCD 14 is a color or monochrome liquid crystal display having sufficient video displaying capabilities (such as resolution) to display motion picture with MPEG-4, and displays a picture according to video data supplied from the LCD interface 13.

For example, a CCD camera is used as the camera portion 15, which picks up an image of an object, creates video data, and sends it to the camera interface 16. The camera interface 16 receives the video data from the camera portion 15, converts the data into a form that can be processed by the video codec 12, and supplies the data to the codec 12. If a photography inhibit cancel command is supplied from the main controller 10, the camera interface 16 routes the command to the camera portion 15.

The multiplexing and separating portion 17 multiplexes encoded video data supplied from the video codec 12 via the sync bus 28, the encoded audio data supplied from the voice codec 20 via the sync bus 30, and other data supplied from the main controller 10 via the main bus by a given method, for example, according to ITU-T Rec. H.221 or the like. The multiplexing and demultiplexing portion 17 supplies the multiplexed data as transmitted data to the PHS line interface 18 via the sync bus 29.

The multiplexing and demultiplexing portion 17 demultiplexes encoded video data, encoded audio data, and other data from the transmitted data supplied from the PHS line interface 18 via the sync bus 29. The multiplexing and demultiplexing portion 17 supplies the demultiplexed data to the video codec 12, the voice codec 20, and the main controller 10, respectively, via the sync buses 28, 30, and the main bus 27.

The PHS line interface 18 is a section used to make a wireless connection to a PHS network via the antenna 19. The interface 18 makes various calls for communications via the PHS network and sends and receives data via communications paths established in the PHS network.

The voice codec 20 digitizes analog audio signal applied via the microphone 21 and the microphone interface. The codec 20 encodes the signal by a given audio encoding method such as ADPCM to create encoded audio data, and sends the encoded audio data to the multiplexing and demultiplexing portion 17 via the sync bus 30.

The voice codec 20 decodes the encoded audio data supplied from the multiplexing and demultiplexing portion 17 into analog audio signal, which is supplied to the speaker interface 23.

The microphone 21 converts sound from the surroundings into an audio signal and supplies it to the microphone interface 22, which in turn converts the audio signal supplied from the microphone 21 into a signal form that can be processed by the voice codec 20 and supplies it to the voice codec 20.

The speaker interface 23 converts the audio signal supplied from the voice codec 20 into a signal form capable of being processed by the speaker 24, and supplies the converted signal to the speaker 24. This speaker 24 converts the audio signal supplied from the speaker interface 23 into an audible signal at an increased level.

The manual control portion 25 receives various instructions of the user to be applied to the main controller 10. The manual control portion 25 has control buttons for specifying various functions, push buttons for entering phone numbers and various numerical values, and a power switch for turning on and off the operation of the present terminal. The manual entry control circuit portion 26 recognizes the contents of an instruction entered from the manual control portion 25 and informs the main controller 10 of the contents of the instruction.

The present terminal is further equipped with a power supply section (not shown) for supplying electric power to the various portions described above.

The operation of the multimedia communications terminal of the construction described above is next described. The various portions of the multimedia communications terminal are all under control of the main controller 10 and operate as follows.

Figure 7:
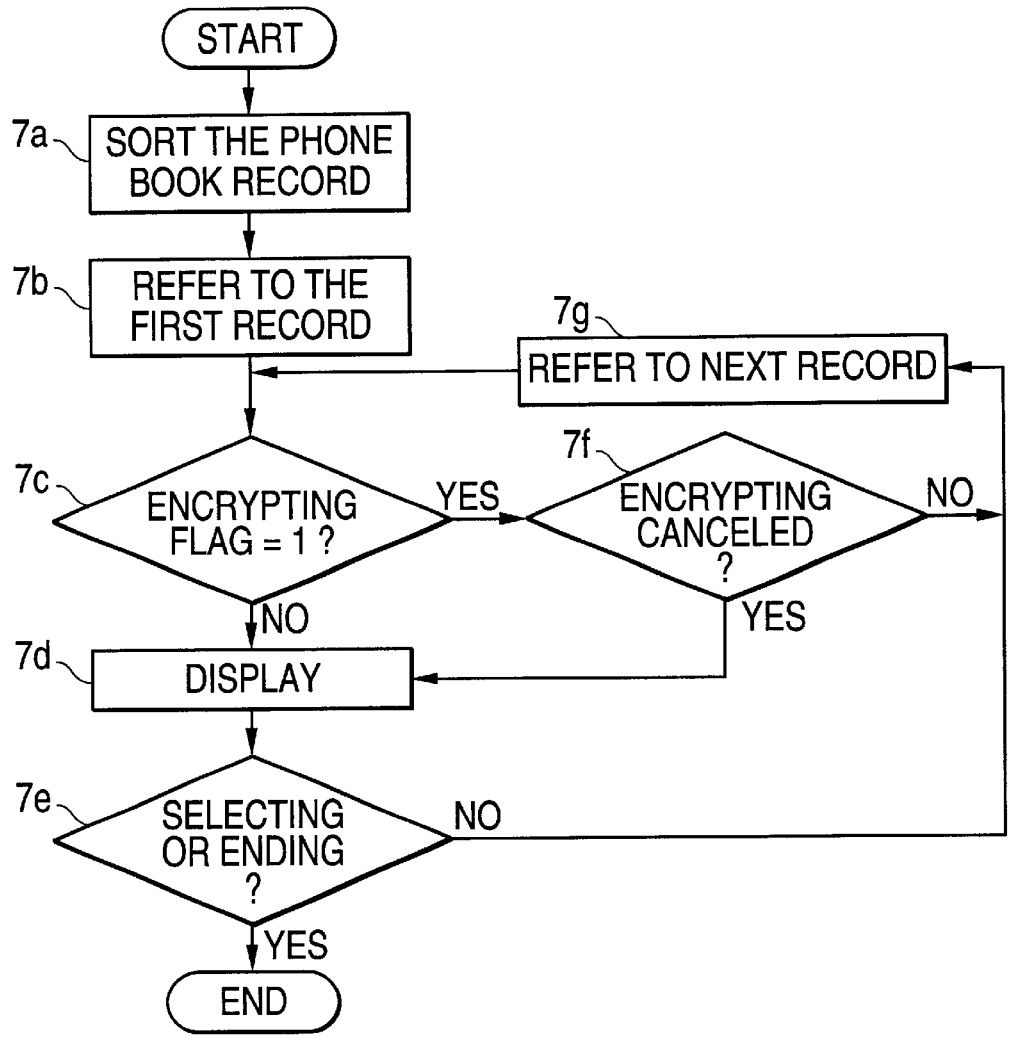
FIG. 7 is a flowchart illustrating processing for displaying data stored in the phone book memory of the multimedia communications terminal shown in FIG. 1.

The display process of data stored in the phone book memory 11 is described. The process is illustrated in the flowchart of FIG. 7.

In step 7a, records stored as a database in the phone book memory 11 are sorted in an ascending or descending order of name, in order of entering record, in order of number of outgoing calls, or in order of number of incoming calls. Then, control goes to step 7b.

In step 7b, the first one of records stored in the phone book database sorted in step 7a is referenced, and then control proceeds to step 7c.

In step 7c, a decision is made as to whether the encrypting flag of the referenced record is 1 or not. If the flag is 0, control goes to step 7d. If the encrypting flag is 1, control goes to step 7f.

Figure 8:
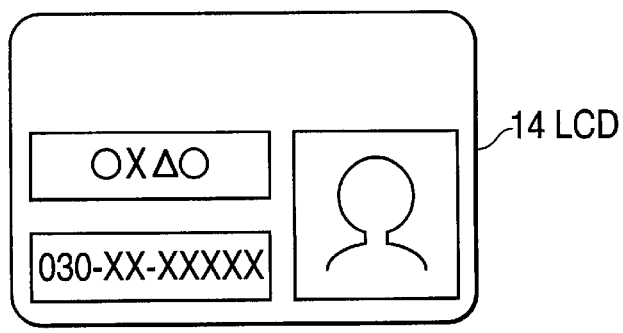
FIG. 8 is a view depicting an example of display provided on an LCD of the multimedia communications terminal shown in FIG. 1.

In step 7d, the referenced record is displayed on the LCD 14. FIG. 8 shows an example of this display. The corresponding phone number and image data are displayed, along with the name. Control then proceeds to step 7e.

In step 7e, a decision is made as to whether an instruction for selecting the phone number displayed in step 7d as the phone number of the connected party or an instruction for ending this displaying processing is given. If either instruction is given, this processing is ended. If other instruction is given, control goes to step 7g.

In step 7f, a decision is made as to whether the encrypting function described above has been canceled. If this function has been canceled, control goes to step 7d, where information about the referenced record is displayed. If the encrypting function has not been canceled, control proceeds to step 7g.

The cancellation of the encrypting function is performed prior to the displaying processing by entering a preset secret password.

In step 7g, the record that is next in order to the record referenced in step 7b is referenced, and control goes to step 7c.

Figure 9:
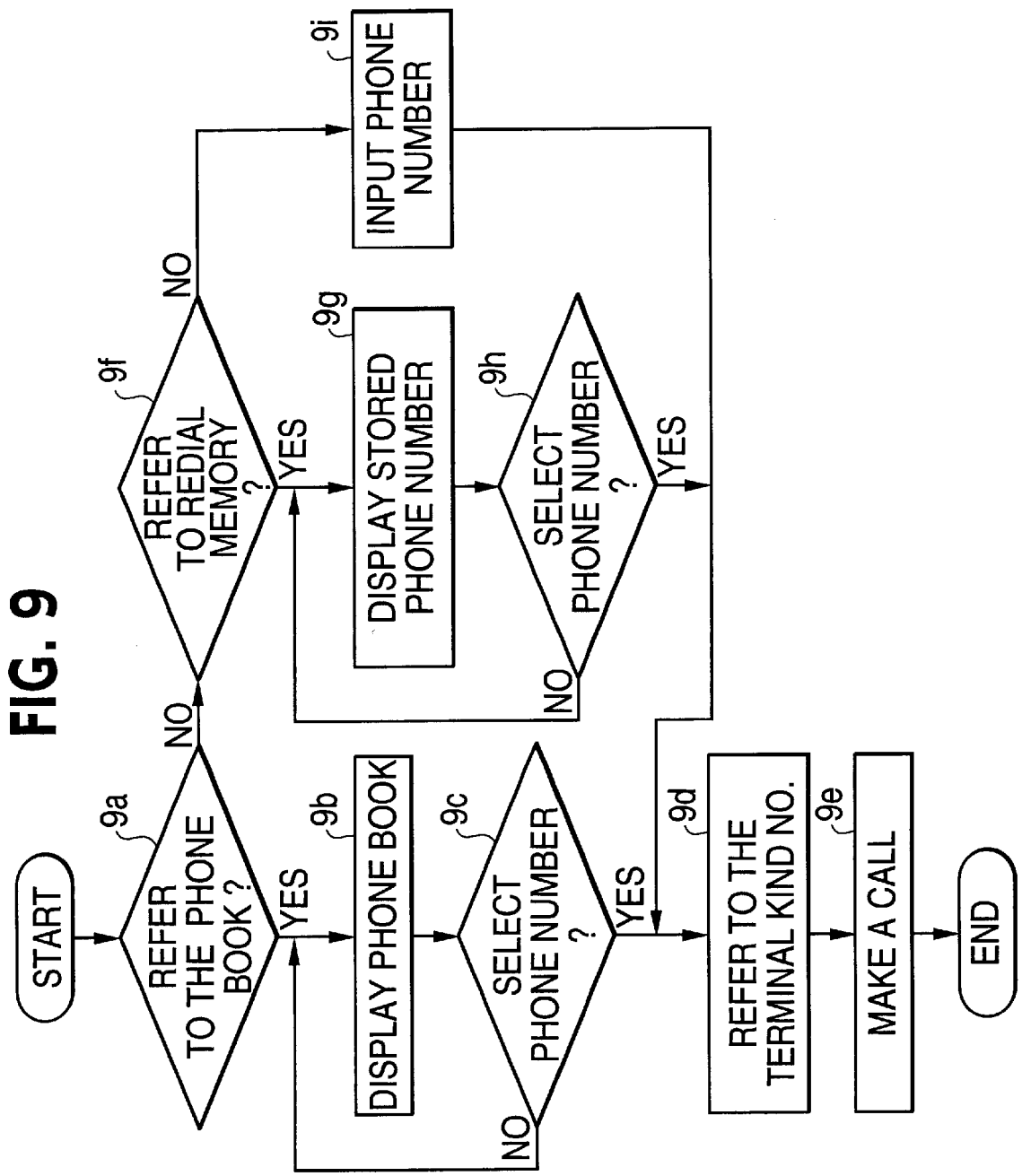
FIG. 9 is a flowchart illustrating an outgoing call made by the multimedia communications terminal shown in FIG. 1.

Processing for selecting a party to be connected and processing for making an outgoing call to this party are next described by referring to the flowchart of FIG. 9.

In step 9a, a decision is made as to whether a request for referencing the phone book database stored in the phone book memory 11 is made from the user via the manual control portion 25 in making an outgoing call. If the result is YES, control goes to step 9b. If the result of the decision is NO, control proceeds to step 9f.

In step 9b, in response to the request from the user via the manual control portion 25, records in the phone book memory 11 are read out successively. The phone numbers of the records are displayed on the LCD 14, and then control goes to step 9c.

In step 9c, a decision is made as to whether an operation for selecting any phone number displayed in step 9b is performed via the manual control portion 25. That is, the manual control portion is monitored. If such an operation is performed to select any phone number displayed in step 9b, control goes to step 9d. If such an operation is not done, control goes to step 9b.

In step 9f, a decision is made as to whether a request for referencing a redial memory stored in the RAM of the main controller 10 is made by the user via the manual control portion 25. If such a request is made, control proceeds to step 9g. If such a request is not made, control goes to step 9i.

In step 9g, in response to the user's request via the manual control portion 25, phone number data stored in the redial memory are read out successively and displayed on the LCD 14. Then, control goes to step 9h.

In step 9h, a decision is made as to whether an operation for selecting any phone number displayed in step 9g is performed via the manual control portion 25. If such an operation is performed, control goes to step 9d. If such an operation is not performed, control proceeds to step 9g.

In step 9i, user's entry of the phone number of the party to be connected is accepted via the manual control portion 25, and then control goes to step 9d.

In step 9d, a record corresponding to the phone number selected in step 9c, the phone number selected in step 9h, or the phone number entered in step 9i is read from the phone number book memory 11. A terminal kind number and a sender information notice flag corresponding to the phone number are referenced. Then, control goes to step 9e.

In step 9e, a protocol corresponding to the terminal kind number referenced in step 9d is selected from the protocols p1–p3 stored in the ROM of the main controller 10. An outgoing call is made according to the selected protocol.

In making this outgoing call, it is determined whether information identifying this terminal is sent to the other party or not, depending on the state of the sender information notice flag corresponding to the other party by referencing the phone book memory 11.

The sequences of communications provided in accordance with the protocols p1–p3 selected in step 9e illustrated in FIG. 9 are next described.

Figure 10:
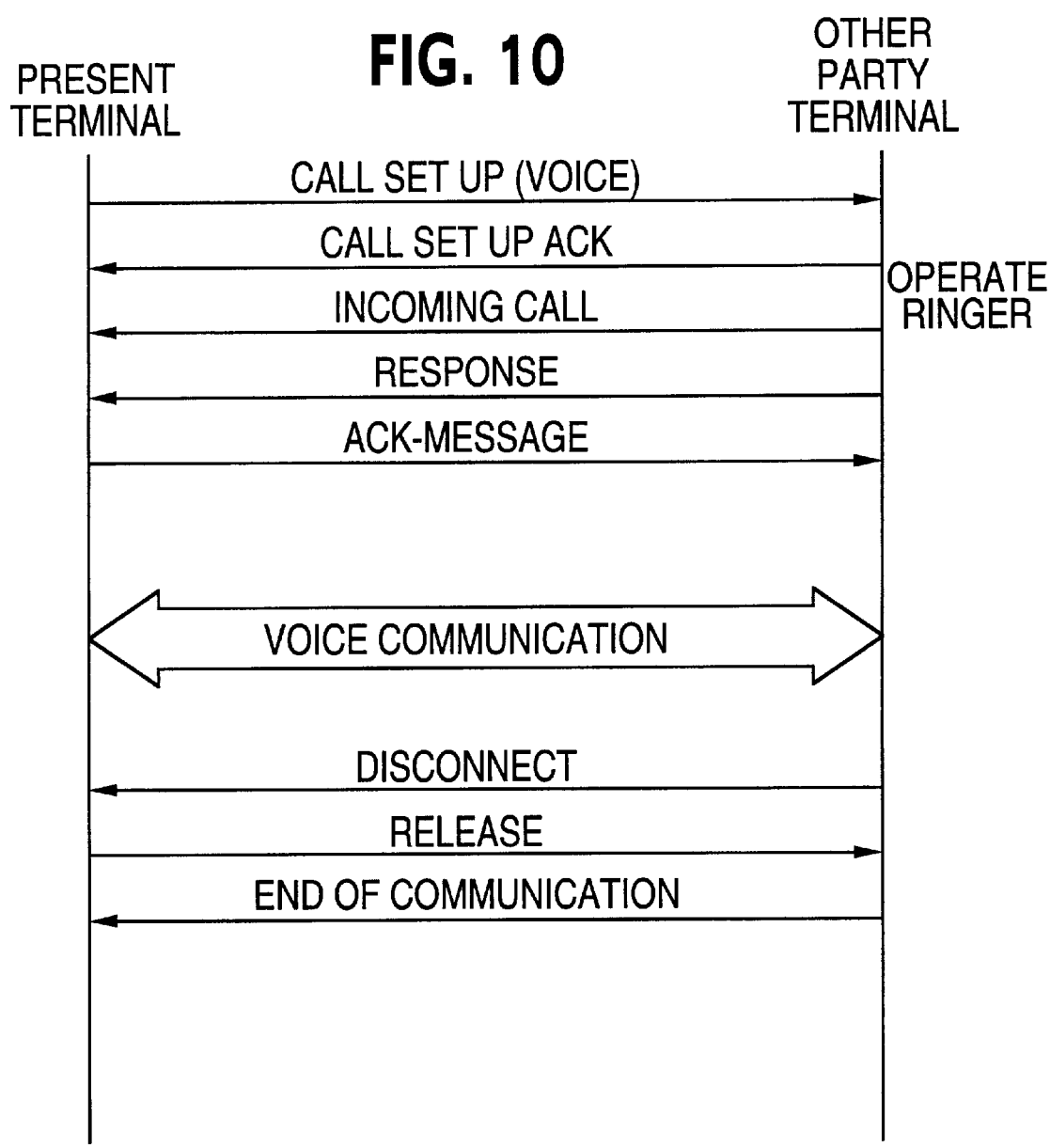
FIG. 10 is a diagram illustrating a sequence of operations performed by the multimedia communications terminal shown in FIG. 1 when the terminal provides voice communications.

First, communications are provided according to the protocol p1 for voice communications. The sequence is described by referring to FIG. 10.

First, the present terminal that serves as a sending terminal makes an outgoing call by sending a call setup message to the other party to be connected. At this time, the present terminal informs the other party of the transmission capabilities indicating whether it supports voice communications, via the call setup message.

If the terminal connected to the present terminal receives the call setup message, the terminal of the other party recognizes it and sends a call setup acknowledgment message to the present terminal. Then, the terminal informs the user of an incoming call by operating a tone ringer, a vibrator, a light-emitting diode, or the like and sends a calling message to the present terminal.

Then, if the user of the terminal of the other party performs an off-hook operation to respond in voice communications, then the terminal of the other party inserts information indicating the terminal kind of the present terminal or information indicating that it supports voice communications in the inter-user information notice field of the responding message. This responding message is sent to the present terminal that is a sending terminal.

The present terminal receives the above-described responding message. If the present terminal confirms that the terminal of the other party supports voice communications, the present terminal sends an acknowledging message to the terminal of the other party, and then a voice communication is started.

At this time, the present terminal executes processing for updating the contents of the phone book database in the phone book memory 11 according to the information indicating the kind of the other party, the information being received from the terminal of the other party via the inter-user information notice field. This will be described in detail below.

After end of the voice conversation, if one (the terminal of the other party in FIG. 10) of the two terminals performs an on-hook operation and the communications link is disconnected, the other terminal releases the line, thus ending the communications.

Figure 11:
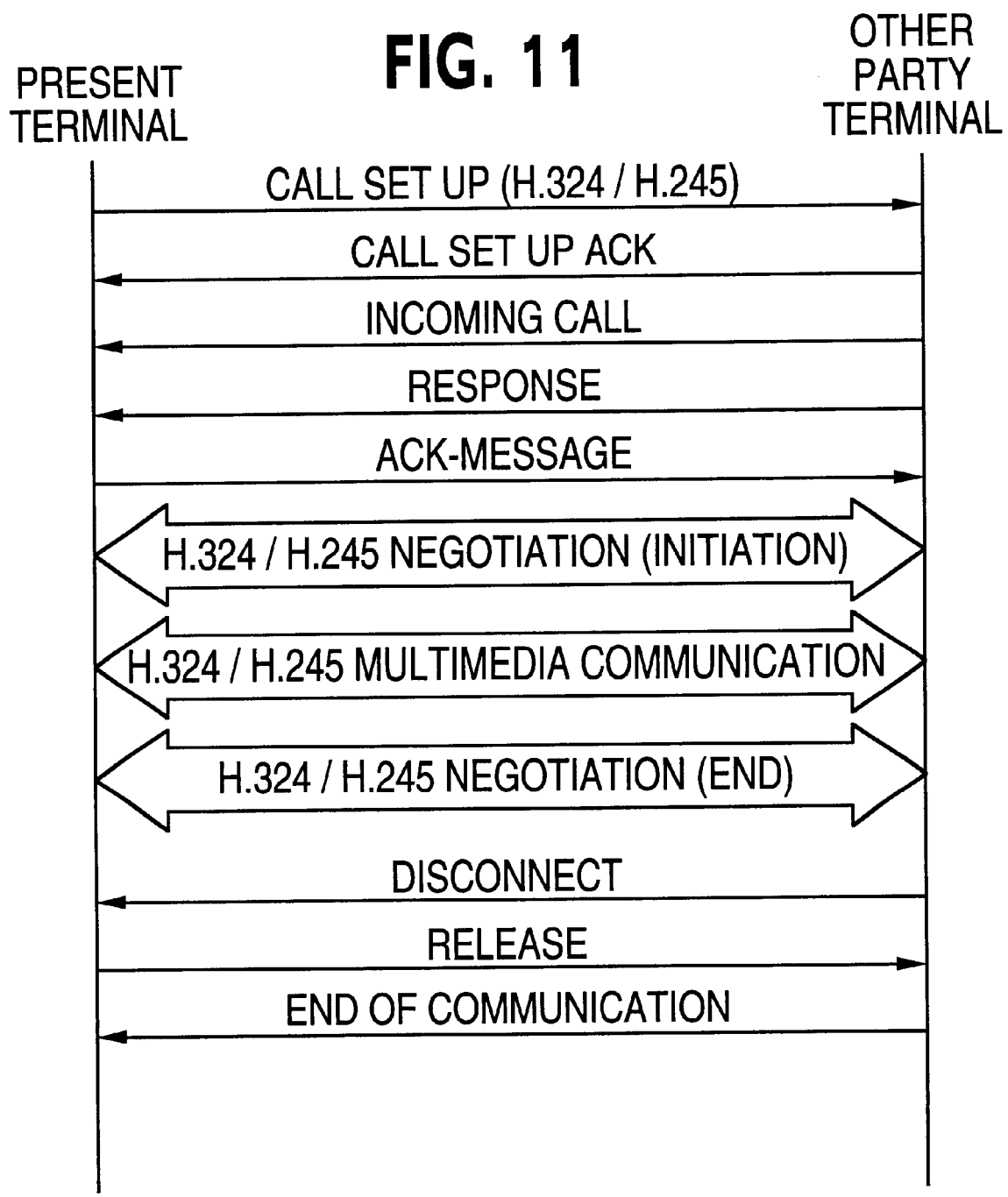
FIG. 11 is a diagram illustrating a sequence of operations performed by the multimedia communications terminal shown in FIG. 1 when the terminal provides multimedia communications.

A sequence where communications are provided according to the protocol p2 for multimedia communications is next described by referring to FIG. 11.

First, the present terminal acting as a sending terminal sends a call setup message to the terminal of the other party to make an outgoing call. At this time, the present terminal informs the other party that the present terminal supports multimedia communications conforming to H.324/H.245 that are ITU-T. standards, i.e., informs the other party of the communications capabilities of the present terminal.

On receiving the call setup message, the terminal of the other party recognizes it and sends a call setup acceptance message to the present terminal. Then, the terminal of the other party informs the user of an incoming call by operating a tone ringer, a vibrator, a light-emitting diode, or the like. The terminal then sends a calling message to the present terminal.

If the user of the terminal of the other party performs an off-hook operation to respond in multimedia communications, the terminal of the other party inserts information indicating the terminal kind of the present terminal or information indicating that it supports multimedia communications complying with H.324/H.245 that are ITU-T. standards in the inter-user information notice field of the acknowledging message. This message is sent to the present terminal that is a sending terminal.

The present terminal receives the acknowledging message. If it confirms that the terminal of the other party provides support for multimedia communications, the present terminal sends an acknowledging message to the terminal of the other party, and multimedia communications are initiated.

At this time, the present terminal executes processing for updating the contents of the phone book database in the phone book memory 11 according to the information indicating the kind of the other party, the information being received from the terminal of the other party via the inter-user information notice field. This will be described in detail below.

In the multimedia communications, video data are sent and received according to the state of the sent/receive YES/NO flag corresponding to the connected terminal, the flag being stored in the phone book memory 11. Audio data are sent and received in a normal manner.

If the send/receive YES/NO flag indicates that sending of video data is not permitted, the multiplexing and demultiplexing portion 17 supplies only encoded audio data as transmitted data to the PHS line interface 18 via the sync bus 29.

If the send/receive YES/NO flag indicates that reception of video data is not permitted, the multiplexing and demultiplexing portion 17 extracts only the encoded audio data from the demultiplexed, transmitted data and supplies the extracted data to the voice codec 20.

As the multimedia conversion ends, if an on-hook operation is performed on one (the connected terminal in FIG. 11) of the two terminals, an end negotiation is performed between both terminals. Then, the communications link is disconnected and released. The communications end.

Figure 12:
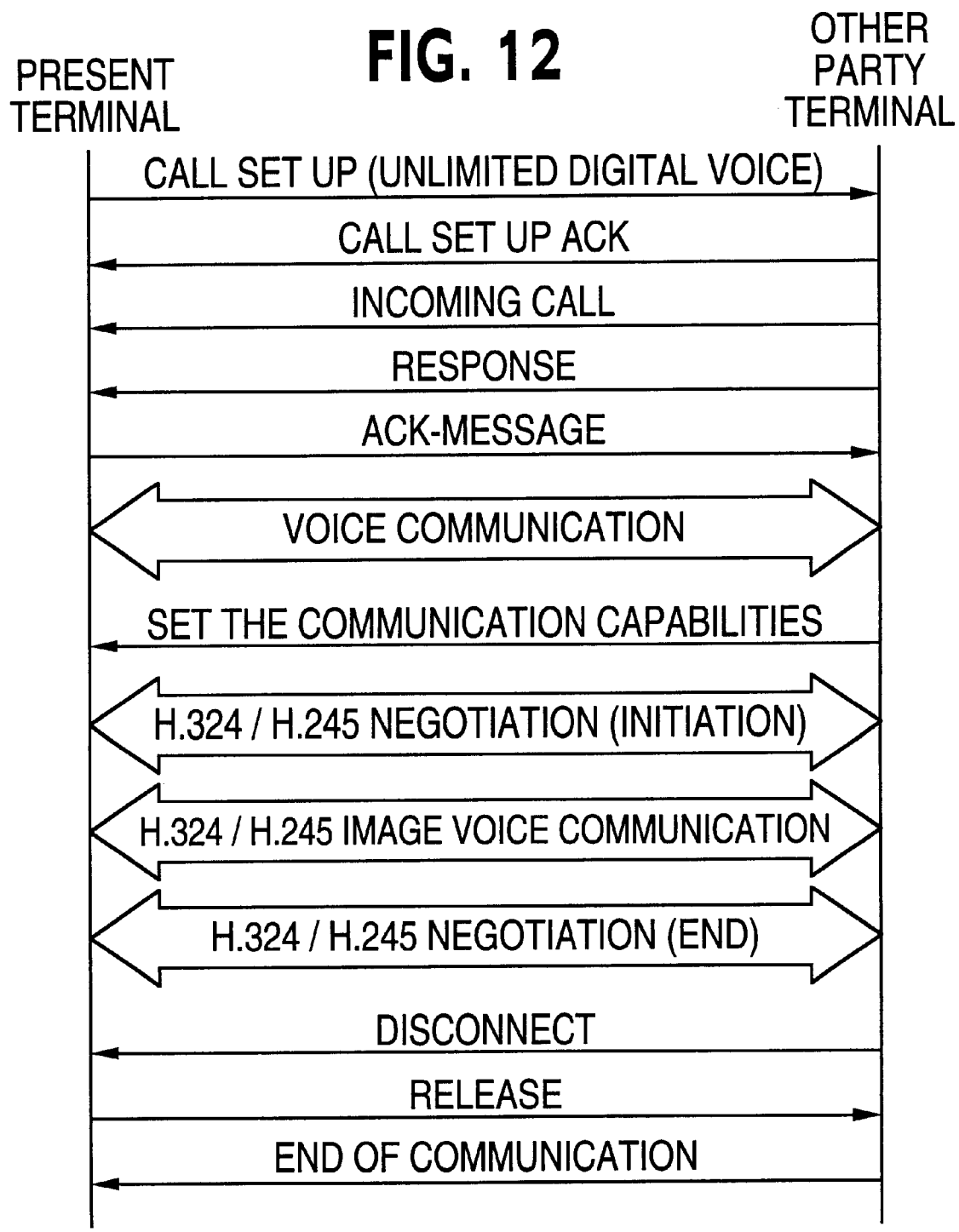
FIG. 12 is a diagram illustrating a sequence of operations performed by the multimedia communications terminal shown in FIG. 1 when the mode of operation is switched from voice communications to multimedia communications.

The sequence utilized where communications are provided according to the protocol p3 (which permits the mode of communications to be switched to multimedia communications from voice communications) is described by referring to FIG. 12.

First, the present terminal acting as a sender terminal sends a call setup message to a terminal to be connected and makes an outgoing call. At this time, the present terminal informs the other party that the present terminal supports voice mode in an unlimited digital communications mode via the call setup message, i.e., informs the other party of the communications capabilities.

On receiving the call setup message, the terminal of the party to be connected recognizes it and informs the user of the incoming call by operating a tone ringer, a vibrator, a light-emitting diode, or the like. Then, the terminal of the other party sends a call setup acceptance message and a calling message to the present terminal sequentially.

If the user on the side of the connected terminal performs an off-hook operation and responds in voice communications, the terminal of the connected terminal inserts various kinds of information in the inter-user information notice field of the responding message. One of these various kinds of information indicates the kind of the present terminal. Another kind of information indicates the communications capabilities of the present terminal, i.e., that the terminal provides support for an unlimited digital communications mode and provides support for communications utilizing a voice encoded system in voice communications mode. The acknowledging message is sent to the present terminal that is a sender terminal.

The present terminal then makes a decision as to whether communications equivalent to the communications provided by the terminal of the connected party can be provided by the present terminal. The present terminal then inserts communication kind indicating information that is the result of the decision into the inter-user information communication field of the acknowledging message. This message is sent to the connected terminal.

If the present terminal and the connected terminal both support an unlimited digital communications mode, and if voice-encoded communications are possible in voice mode, a voice conversation complying with the encoded method is performed.

The present terminal receives information indicating the kind of the connected terminal from the connected terminal via the inter-user information notice field. Based on this information, the present terminal executes processing for updating the database of the phone book memory 11. This processing will be described in greater detail later.

Then, one terminal (the connected terminal in FIG. 12) sets the transmission capabilities to provide multimedia communications. If the other terminal (the present terminal in FIG. 12) also supports the multimedia communications, the other terminal accepts the setting. A negotiation for multimedia communications conforming to H.324/H.245 that are ITU-T. standards is started between both terminals. A multimedia conversation using both video and audio data is made.

During the multimedia communications, audio data are sent and received in a normal manner, in the same way as in the case of the protocol p2. On the other hand, video data are sent and received according to the state of the send/receive YES/NO flag that is stored in the phone book memory 11 and corresponds to the connected terminal.

If the send/receive YES/NO flag indicates that transmission of video data is not permitted, the aforementioned multiplexing and demultiplexing portion 17 supplies only encoded audio data as transmitted data to the PHS line interface 18 via the sync bus 29.

If the send/receive YES/NO flag indicates that reception of video data is not permitted, the multiplexing and demultiplexing portion 17 extracts only the encoded audio data from the demultiplexed, transmitted data and supplies the extracted data to the voice codec 20.

After end of the voice conversation, if an on-hook operation is performed on one (the terminal of the other party in FIG. 12) of the two terminals, a negotiation on the end is performed between both terminals. Then, the communications link is disconnected and released, thus ending the communications.

Figure 13:
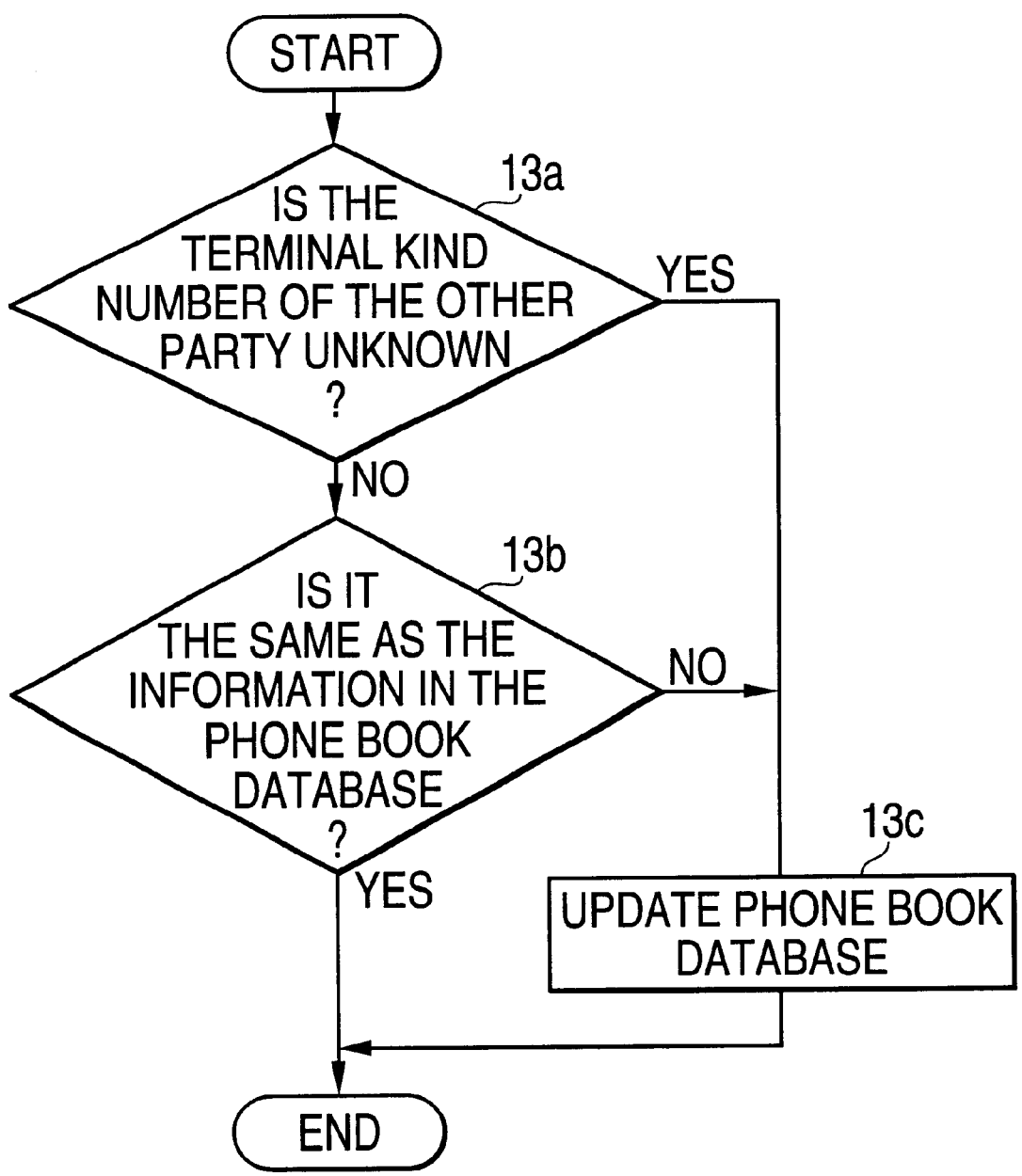
FIG. 13 is a flowchart illustrating updating of phone book database conducted during communications of the multimedia communications terminal shown in FIG. 1.

Processing for updating the phone book database used during communications is next described by referring to the flowchart of FIG. 13.

When a communications link is established and voice communications or multimedia communications are started, the main controller checks the terminal kind number stored corresponding to the phone number of the connected terminal (step 13a).

If "16" is stored as the terminal kind number, control goes to step 13c. If any terminal kind number other than "16" is stored, control proceeds to step 13b.

In step 13b, a decision is made to judge whether information sent from the connected terminal via the inter-user information notice field during a call setup agrees with the information stored in the phone book database of the phone book memory 11.

If they agree, this processing is ended. If they do not agree, control goes to step 13c.

In step 13c, the main controller obtains a terminal kind number corresponding to the information sent from the connected terminal via the inter-user information notice field during the call setup. The main controller stores the obtained terminal kind number in the phone book memory 11 such that it corresponds to the phone number of the connected terminal. Thus, the phone book database is updated. In this way, this processing is ended.

Figure 14:
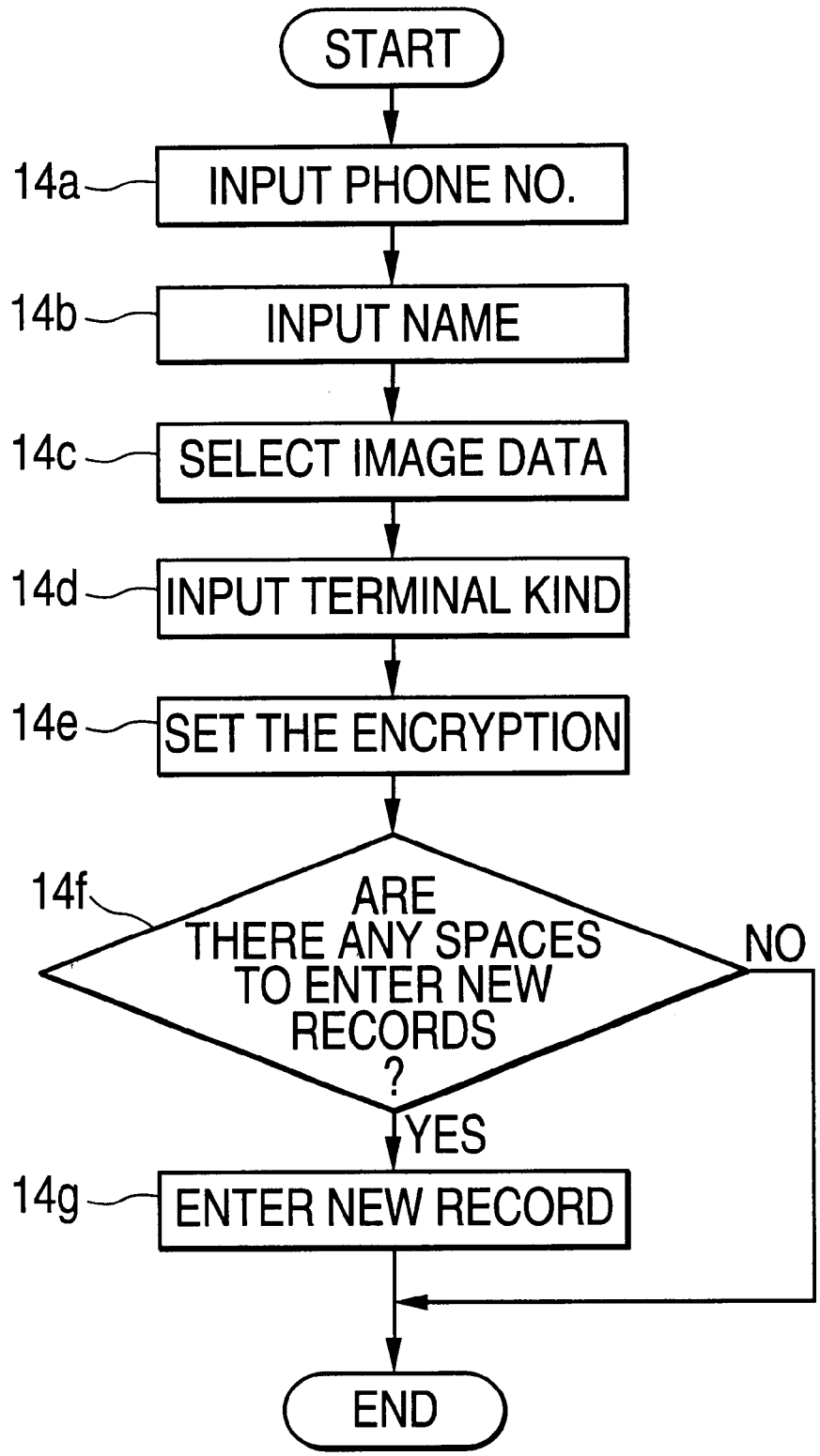
FIG. 14 is a flowchart illustrating the manner in which data are entered in the phone book memory of the multimedia communications terminal shown in FIG. 1.

An operation for entering data items into the phone book database stored in the phone book memory 11 is next described by referring to the flowchart of FIG. 14.

In step 14a, the user operates the ten-key pad on the manual control portion 25 to enter the phone number of the connected terminal, thus displaying on the LCD 14 a phone number to be entered into the database. At this time, phone numbers to be redialed may also be displayed. Furthermore, when a notice of incoming calls is given, phone numbers may be displayed.

In the next step 14b, the user operates the ten-key pad on the manual control portion 25 to enter the names corresponding to the phone numbers with alphanumeric characters or Hiragana or Katakana characters (in Japanese).

In the next step 14c, image data and icons previously stored in the image storage region of the RAM in the main controller 10 are read out to select image data that is made to correspond to the phone number. This selection can be realized by user's operation on the ten-key pad. The manner in which image data is stored in the image storage region described above will be described later.

In the next step 14d, information indicating terminal kinds are displayed in the form of a menu on the LCD 14. At this time, the user operates the ten-key pad of the manual operation portion 25 to select a terminal kind number corresponding to the aforementioned phone number.

Figures 16, 17:
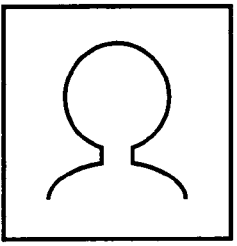
FIG. 16 is a view illustrating an example of display provided on an LCD when the multimedia communications terminal shown in FIG. 1 enters data in the phone book database of the phone book memory.
FIG. 17 is a view illustrating an example of display provided on the LCD of the other party when the multimedia communications terminal shown in FIG. 1 enters data in the phone book database of the phone book memory.

In step 14e, a display as shown in FIG. 16 is provided on the LCD 14 to ask the user whether the phone number is encrypted or not. If the user operates the ten-key pad of the manual operation portion 25 and instructs the number to be encrypted, then the encrypting flag is set to 1. Conversely, if the number is instructed not to be encrypted, the encrypting flag is set to 0.

In the next step 14f, a decision is made as to whether the phone book memory 11 has a space to enter new records.

If such a space exists, control goes to step 14g. Information input by the user in steps 14a–14e is taken as one record and entered into the phone book memory 11. The processing is then ended. On the other hand, if no space is available, the main controller informs the user of this fact and ends the processing.

It is to be noted that the information input by the user using the steps 14a–14e is not always fully entered. Records put in the phone book memory 11 may be read out later. Additional information may be added. Also, the information may be modified or erased.

Figure 15:
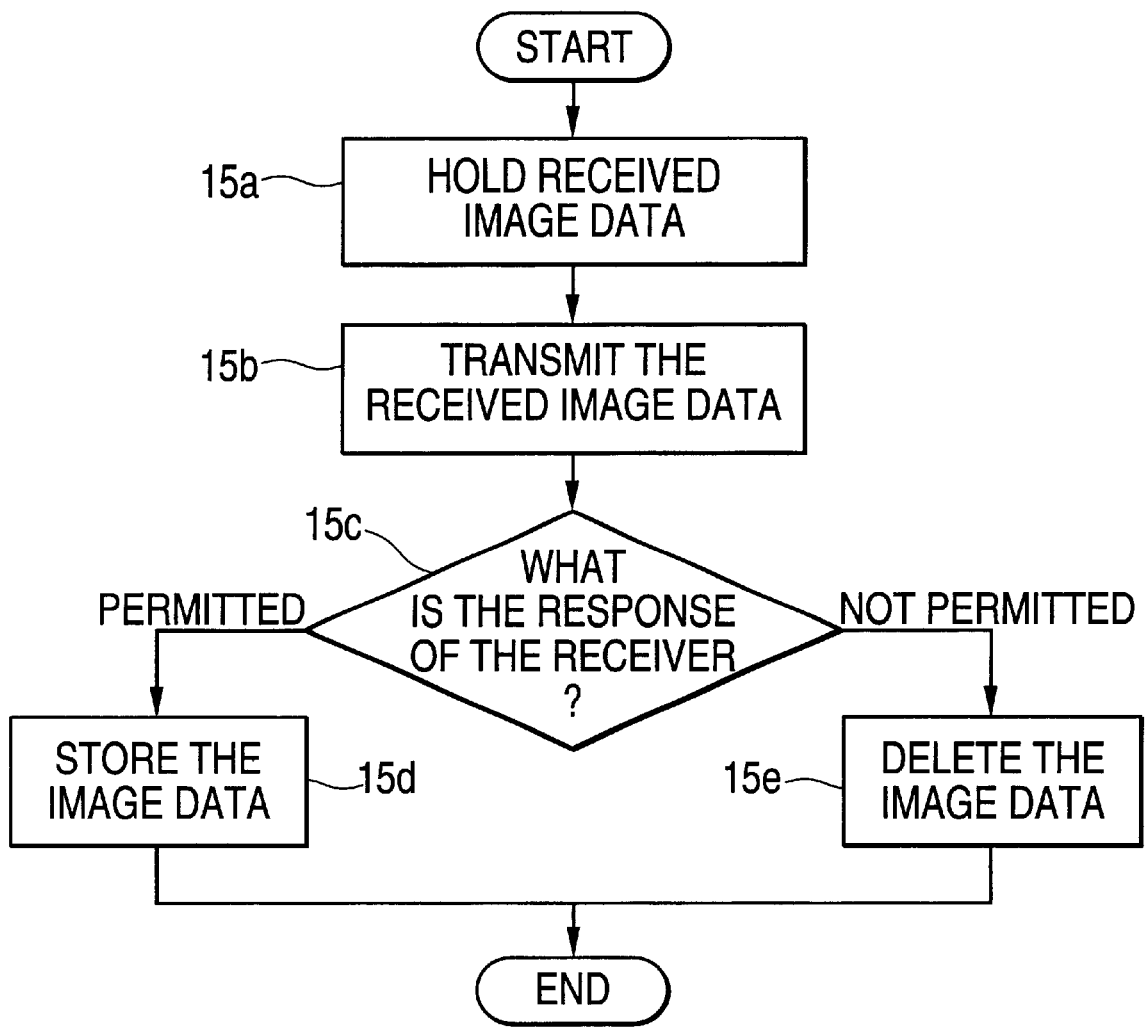
FIG. 15 is a flowchart illustrating processing for storing image data about the other party when the image data are not stored in the multimedia communications terminal shown in FIG. 1.

It is now assumed that image data from the other party is not stored such that it corresponds to the phone book database of the other party. In this case, processing for storing the image data is performed in the manner described below. This processing is carried out during multimedia communications with the other party. This processing is illustrated in FIG. 15.

In step 15a, the user pushes ACCEPT button on the manual control portion 25. Correspondingly, image data is received from the other party. Of the received image data, one frame of image is temporarily held in a specified region of the RAM of the main controller 10.

In step 15b, image data accepted in step 15a is inserted into the image picked up by the camera portion 15 and sent to the other party. This image to be sent to the other party has a mark indicating that this image will be stored into the phone book database. On the terminal of the other party receiving the marked image, a display as shown in FIG. 17 is provided on the display portion.

In the next step 15c, the machine waits for arrival of a response from the other party. If a response indicating that the other party permits entry into the database, control goes to step 15d. If a response indicating that the entry is not permitted, control proceeds to step 15e.

In step 15d, image data put into the specified region of the RAM of the main controller 10 is stored in the image storage region of the phone book memory 11 and addressed, corresponding to the phone number of the other party. Then, the processing is ended. In step 15e, the image data put into the specified region of the RAM of the main controller 10 is erased, and then the processing is ended.

In the multimedia communications terminal of the construction described above, the kind of the connected terminal is stored in the phone book memory 11 such that it corresponds to the phone number of the connected party in the phone book database. A connection is made according to a protocol corresponding to the kind of the connected terminal.

Accordingly, the multimedia communications terminal of the construction described above can start communications in connection procedures adapted for the desired communications. Therefore, unnecessary connection procedures can be omitted. This alleviates the burden on the switching station. Hence, desired communications can be initiated quickly.

Furthermore, in the multimedia communications terminal of the construction described above, information indicating whether transmission and reception of video data is permitted or not (send/receive YES/NO flag) is stored for each phone number in the phone book memory 11. Where multimedia communications are provided, video data are sent and received according to the information described above.

Consequently, with this multimedia communications terminal, permission or inhibition of transmission and reception of video data can be determined for each individual party with which the present terminal communicates. Therefore, it is possible that audio data are sent and transmitted, while video data are only received.

Moreover, in the multimedia communications terminal of the construction described above, information (sender information notice flag) indicating whether a notice of information about the sender is given is stored for each phone number in the phone book memory 11. Information about the sender is transmitted according to the stored information.

In consequence, the decision as to whether information about the sender is sent or not can be made, depending on each individual party with which the present terminal communicates.

In addition, the multimedia communications terminal of the above-described construction once retransmits image taken from the other party and checks if the other party permits the image to be entered into the database of the present terminal. Then, the image is stored as a phone book data item. If the other party rejects it, image data indicating that the terminal of the other party supports multimedia communications is entered in the phone book database instead of the image taken from the other party.

Therefore, the multimedia communications terminal of the construction described above enables the other party to choose whether image data taken from the other party is entered in the phone book database. Therefore, the problem of infringement of privacy or the right to the portraits can be avoided. Additionally, if the other party rejects entry of taken image data, it can be seen that the other party supports multimedia communications by referring to the phone book database.

It is to be understood that the present embodiment is not limited to the embodiment described above. For instance, in the embodiment described above, information about the kind of communications is sent to the other party by interuser information during call setup. Instead, information about the kind of communications may be sent to the other party, using transmission capabilities, subaddresses, incoming numbers, outgoing numbers, and so on.

In the embodiment described above, terminals are classified in terms of protocols into terminals supporting telephone communications services and terminals supporting multimedia communications services. Furthermore, terminals may be classified further as terminals supporting data communications services, as well as the above-described terminals. Protocols providing unlimited bearer communications are used for a call connection to a terminal that supports data communications services.

Further, terminals may be categorized in terms of communications capabilities of terminals such as transmission speed rather than kinds of transmitted data.

Where terminals are classified in terms of communication speed, they may be classified according to kinds of terminals, such as analog telephone, ISDN telephone, analog cellular phone, digital cellular phone, and PHS phone.

Where the transmission speed differs in some locations on the communication path between the present terminal and the connected terminal, the minimum transmission speed on the communication path is stored as communications capabilities in the phone book memory 11 in a correlated relation to the telephone number of the connected party.

For example, where a connection is made from a wireless network to a terminal on a high-speed wireline network, the transmission speed on the wireless network that is lower than on the wireline network is stored in connection with the telephone number of the connected party.

Where communications with the other party should be provided, the phone book memory 11 is referenced, and communications are provided at the above-described transmission speed. This eliminates the following procedure: Communications are once started at the communication speed on the wireline network higher than the communication speed on the wireless network, and then the speed is switched to the communication speed on the wireless network. Hence, communications can be started at the communication speed on the wireless network. This alleviates the burden on the switching station. Furthermore, communications can be initiated quickly.

In the embodiment described above, image data is stored as illustrated in the flowchart of FIG. 15. Image data may also be stored by other method.

For example, image data to be entered in the phone book database is previously stored in the terminal of the other party for each individual multimedia communications terminal. When the other party requests that image data be entered into the phone book database, the image data is sent to the other party, which in turn enters the image data into the phone book database.

Where the processing for entering the video data into the database is performed in this way, the party whose video data can be entered into the database sends the video data to the other party for entry into the database. In consequence, the problem of infringement of privacy and the right to the portraits can be circumvented.

In the description given above, the phone book database of the phone book memory 11 is updated when communications are started. Alternatively, the phone book database of the phone book memory 11 may be searched at any time when outgoing and incoming calls are made, and if information indicating the kind of the terminal obtained from the other party is different from the information stored in the phone book database, the contents may be updated at any time.

Obviously, the invention can be practiced even with various modifications within the scope of the present invention which is delineated by the following claims.

What is claimed is:

1. A multimedia communications terminal capable of providing communications in terms of audio and video information, said multimedia communications terminal comprising:

other party information storage means for storing a first kind of information for discerning other party with which said multimedia communications terminal communicates and a second kind of video information such that these first and second kinds of information are correlated with each other;

an image storage YES/NO inquiry means for sending an inquiry to said other party to ask whether video data received from the other party that supports multimedia communications can be stored as said image information; and an image information writing means for storing said image information in said other party information storage means if response to said inquiry by the image storage YES/NO inquiry means is that storing is permitted.

2. The multimedia communications terminal of claim 1, wherein said image information writing means stores given image information indicating that the terminal of said other party supports multimedia communications if response to said inquiry by the image storage YES/NO inquiry means is that storing is not permitted.

3. The multimedia communications terminal of claim 1, wherein there is further provided an image information storage detection means for sensing whether image information about said other party is stored in said other party information storage means, and wherein said image storage YES/NO inquiry means sends an inquiry to said other party to ask whether image information received from said other party can be stored as said image information if said image information storage detection means senses that image information about said other party is not stored.

4. The multimedia communications terminal of claim 1, wherein there is further provided an image data storage means for storing image data corresponding to said image data, and wherein other party information storage means stores information indicating position of image data stored in said image data storage means as said image information.

5. The multimedia communications terminal of claim 1, wherein there is further provided a responsive means for responding to an inquiry from said other party that supports multimedia communications to ask whether video data delivered from said multimedia communications terminal is allowed to be stored or not.

6. A multimedia communications system having first and second multimedia communications terminals capable of providing communications in terms of audio and video information, said first multimedia communications terminal being equipped with a responsive means for responding to an inquiry from the second multimedia communications terminal to ask whether video data from said second multimedia communications terminal is allowed to be stored or not;

said second multimedia communications terminal comprising other party information storage means for storing information for discerning other party and image information in a correlated relation to each other, an image storage YES/NO inquiry means for sending an inquiry to said other party to ask whether video data received from said other party supporting multimedia communications can be stored as said image information; and an image information writing means for storing said image information in said other party information storage means if response to the inquiry from said image storage YES/NO inquiry means is that storing is permitted.

7. The multimedia communications terminal of claim 1, wherein said image information writing means stores given image information indicating that said other party supports multimedia communications if response to an inquiry from said image storage YES/NO inquiry means is that storing is not permitted.

* * * * *